United States Patent [19]
Lohmann et al.

[11] Patent Number: 5,893,042
[45] Date of Patent: Apr. 6, 1999

[54] METHOD FOR DETECTING COMBUSTION MISFIRES AT ONE OR MORE PERMANENTLY MISFIRING CYLINDERS

[75] Inventors: Andrea Lohmann, Stuttgart; Klaus Ries-Müller, Bad Rappenau; Jürgen Förster, Chemnitz, all of Germany

[73] Assignee: Robert Bosch GmbH, Stuttgart, Germany

[21] Appl. No.: 717,898

[22] Filed: Sep. 23, 1996

[30] Foreign Application Priority Data

Sep. 21, 1995 [DE] Germany .................. 195 35 094.4

[51] Int. Cl.$^6$ ........................................ G01M 15/00
[52] U.S. Cl. .................. 701/111; 73/117.3; 123/419; 123/479; 364/551.01
[58] Field of Search ................. 701/29, 99, 101, 701/102, 110, 111, 114; 73/116, 117.2, 117.3; 123/419, 436, 479, 480, 481; 364/550, 551.01

[56] References Cited

U.S. PATENT DOCUMENTS

| | | | |
|---|---|---|---|
| 5,041,980 | 8/1991 | Maddock et al. | 701/101 |
| 5,119,783 | 6/1992 | Komurasaki | 73/117.3 X |
| 5,200,899 | 4/1993 | Ribbens et al. | . |
| 5,239,473 | 8/1993 | Ribbens et al. | . |
| 5,353,636 | 10/1994 | Sakurai et al. | . |
| 5,387,253 | 2/1995 | Remboski, Jr. et al. | . |
| 5,515,720 | 5/1996 | Remboski, Jr. et al. | 701/110 X |
| 5,633,456 | 5/1997 | Stander | 701/110 X |
| 5,691,469 | 11/1997 | Mezger et al. | 73/117.3 |

FOREIGN PATENT DOCUMENTS 4138765  7/1992  Germany .

*Primary Examiner*—Michael Zanelli
*Assistant Examiner*—Edward Pipala
*Attorney, Agent, or Firm*—Walter Ottesen

[57] ABSTRACT

The invention is directed to a method for detecting combustion misfires on the basis of a first input feature signal in which the nonuniformity of the rotational movement (on the basis of rpm or segment times) of the engine is mapped within the first order. According to the method, a permanent misfire at a cylinder is preliminarily detected when a first threshold value is exceeded by the amount of a first input feature signal and a detection signal for permanent misfires at several cylinders is active (and in this way, permanent misfires at several cylinders are recognized) when a threshold value is exceeded by the magnitude of further assigned input feature signals or by the magnitude of the first feature signal when a second threshold value is exceeded. The detection signal for permanent misfires at a cylinder is always switched to be inactive when there is an active detection signal for permanent misfire at several cylinders. When there is an inactive detection signal for permanent misfire at several cylinders, the preliminary detection signal for the permanent misfire at a cylinder becomes finally active and permanent misfires at a cylinder are recognized.

4 Claims, 6 Drawing Sheets

METHOD FOR DETECTING COMBUSTION MISFIRES AT ONE OR MORE PERMANENTLY MISFIRING CYLINDERS

BACKGROUND OF THE INVENTION

Combustion misfires lead to an increase of the toxic substances emitted during operation of the engine and can, in addition, lead to damage of the catalytic converter in the exhaust-gas system of the engine. A detection of combustion misfires in the entire rpm and load ranges is necessary to satisfy statutory requirements as to on-board monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A detection system for combustion misfires includes the following function blocks: sensors, signal processing and feature extraction as well as classification (FIG. 1). The sensors detect, for example, segment times, that is, the time intervals in which the crankshaft passes through a predetermined rotational angle. Feature signals are formed from the segment times in the feature extraction block. The classification block follows the feature extraction block and combustion misfires are detected from the feature signals, for example, by threshold value comparisons or by utilizing a neural network or other known methods.

A system operating on the basis of threshold-value comparisons is already known and disclosed in German patent publication 4,138,765 which corresponds to U.S. patent application Ser. No. 07/818,884, filed Jan. 10, 1992, now abandoned.

In this known method, the segments are realized, for example, by markings on a transducer wheel coupled to the crankshaft. The segment time in which the crankshaft passes through this angle range is dependent, inter alia, upon the energy converted in the combustion stroke. Misfires lead to an increase of the ignition-synchronously detected segment times. Pursuant to the known method, a criterion for the rough-running of the engine is computed from the differences of the segment times. In addition, slow dynamic operations such as the increase of the engine rpm for vehicle acceleration are mathematically compensated.

A rough-running value, which is computed in this way for each ignition, is likewise compared ignition-synchronously to a predetermined threshold value. Exceeding this threshold value is evaluated as a misfire. The threshold value is dependent, as may be required, from operating parameters such as load and engine speed (rpm). This method is then based on the feature extraction in the time range.

Additional methods are known from U.S. Pat. Nos. 5,200,899 and 5,239,473 wherein the transformation of rpm signals in the frequency range by means of discrete fourier transformations is used for feature extraction. The display of the results indicates a block-like application of the transformation to the rpm signals. A block is formed of, for example, m rpm signals. The m rpm signals are determined during a camshaft revolution. However, individual misfires are not optimally resolved in this way. In contrast, if the transformation is performed sequentially, that is, if the evaluation block of m rpm signals is shifted by less than a camshaft rotation, then disadvantages result with respect to the detection of permanent misfires.

The above methods define the results of a block-like analysis in the frequency range and do not consider the further evaluation of the features obtained.

In contrast to the above, the invention includes a complete classification system for combustion misfires. The system is based upon a feature signal which is obtained by evaluating the rpm fluctuations utilizing signal modulation. Obtaining such a feature signal is disclosed in U.S. Pat. No. 5,691,469 which is incorporated herein by reference.

Briefly summarized, this patent application discloses a method for detecting combustion misfires which operates on the basis of a first signal in which the nonuniformity of the rotational movement of the crankshaft of the engine is mapped and wherein a second signal is generated which is periodical and which has a period duration which corresponds to the period duration of a work cycle of the engine or this period duration divided by a whole number k. The method also has a fixed phase relationship to the rotational movement of the crankshaft and the second signal is modulated by a signal based on the first signal and filtered. Also in the method, the modulated third signal, which results from the modulation and filtering, is used to detect combustion misfires and to identify the affected cylinder. The third signal defines an input feature signal with reference to the next-following classification stage wherein the nonuniformity of the rotational movement of the crankshaft of the engine is mapped in the k-th order.

The feature signal obtained in this way contains frequency data as well as time range data with which the signal-to-noise ratio significantly increases for the next-following classification stages.

By limiting to the first order (that is, k=1) for the feature extraction, then, for example, permanent misfires of cylinders, which are arranged symmetrically in the ignition sequence, cannot be detected.

Furthermore, several combinations of permanent misfires of several cylinders (multiple misfires) have components of the first order which lead to an incorrect detection as permanent misfires of a cylinder and to incorrect cylinder identification.

SUMMARY OF THE INVENTION

In view of the foregoing, it is an object of the invention to provide a reliable detection of permanent misfires in one or more cylinders especially in the critical range of low loads at high rpm and a large number of cylinders.

The method of the invention is for detecting combustion misfires in an internal combustion engine. The method includes the steps of: providing a first input feature signal wherein the nonuniformity of the rotational movement of the engine is defined on the basis of rpm or segment times and mapped within the first order; comparing the magnitude of the first input feature signal to a first threshold value and to a second threshold value greater than the first threshold value; providing additional input feature signals wherein the nonuniformity of the rotational movement of the engine is defined on the basis of rpm or segment times and mapped within additional orders; the number of the additional input feature signals being dependent upon the number of cylinders of the engine; providing threshold values assigned to respective ones of the additional orders; comparing the magnitudes of the additional feature signals to a corresponding threshold value of each of the orders; preliminarily recognizing a permanent misfire at a cylinder when the magnitude of the first input feature signal exceeds the first threshold value; causing a recognition signal to be active for permanent misfires at several cylinders and thereby recognize permanent misfires at several cylinders when the magnitude of the corresponding additional input feature signal exceeds at least one of the threshold values or when the magnitude of the first input feature signal exceeds the second threshold value; always switching off the recognition signal for permanent misfires at a cylinder when there is an active recognition signal for permanent misfires at several cylinders; and, causing the preliminary recognition signal for permanent misfires to become finally active and thereby recognize permanent misfires at a cylinder when the recognition signal for permanent misfires at several cylinders is inactive.

The essence of the invention is directed to the classification. The invention presented here permits detecting misfires at several cylinders via the evaluation of additional feature signals which are assigned to further orders. The invention also permits detection and cylinder identification of permanent misfires at a cylinder.

An advantage of the invention is that the frequency and time range data present in the feature signal utilized for evaluation are evaluated whereby the signal-to-noise ratio is significantly increased.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
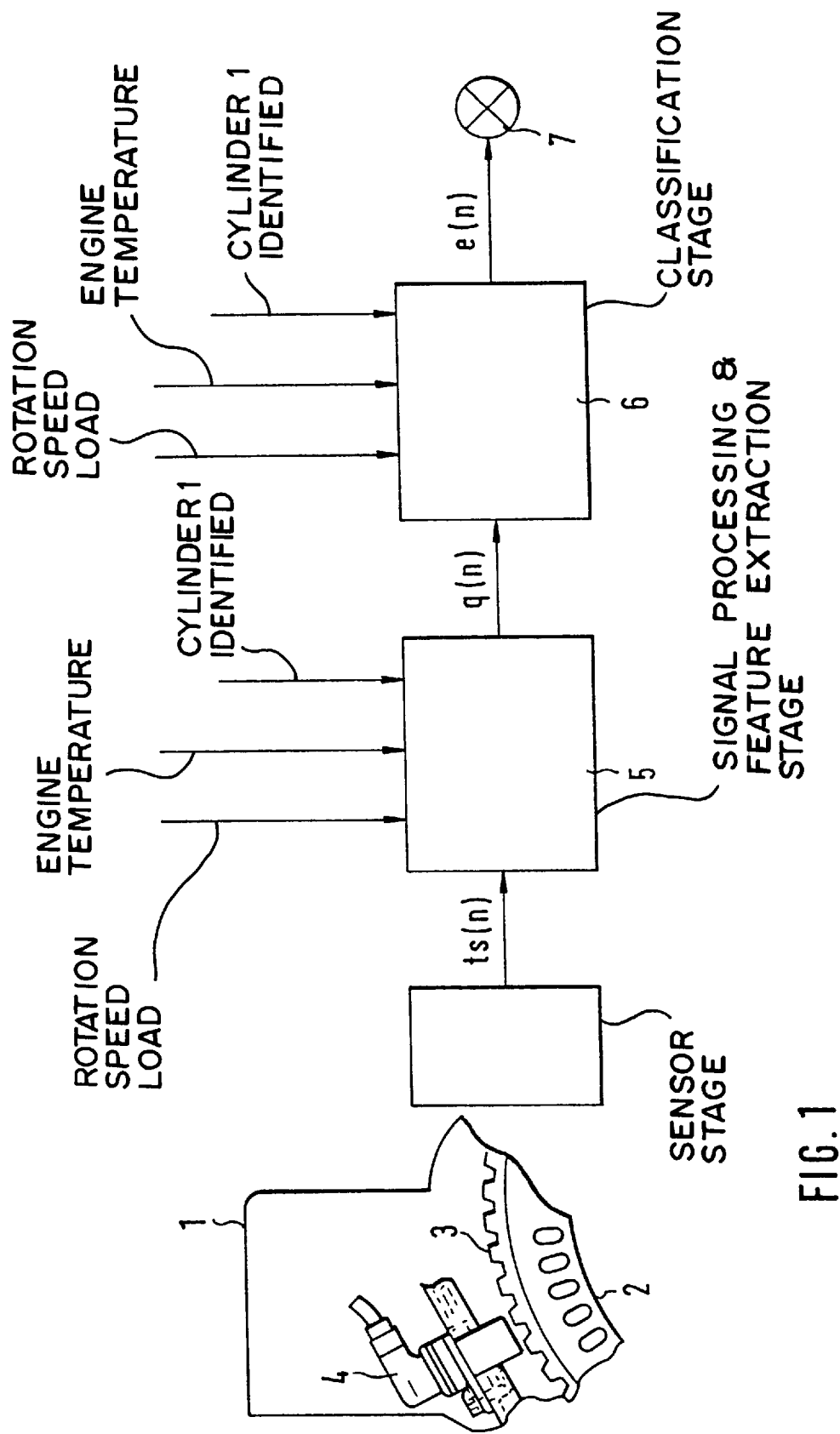
FIG. 1 is a schematic representation of a recognition system for misfire detection to show the setting in which the method of the invention is applied.

FIG. 1 shows an internal combustion engine 1 equipped with a sensor comprising an angle transducer wheel 2 having markings 3 and an angle sensor 4 as well as a block 5 symbolizing the feature extraction, a block 6 symbolizing the classification and a device 7 for displaying the occurrence of combustion misfires. The angle transducer wheel is coupled to the crankshaft of the engine and the rotational movement thereof is converted into an electrical signal with the aid of the angle sensor 4 in the form of an inductive sensor. The periodicity of the electrical signal defines an image of the passing of the markings 3 at the angle sensor 4. The time duration between a rise and a fall of the signal level therefore corresponds to the time in which the crankshaft has rotated farther beyond an angular range corresponding to the extent of a marking.

Figure 2:
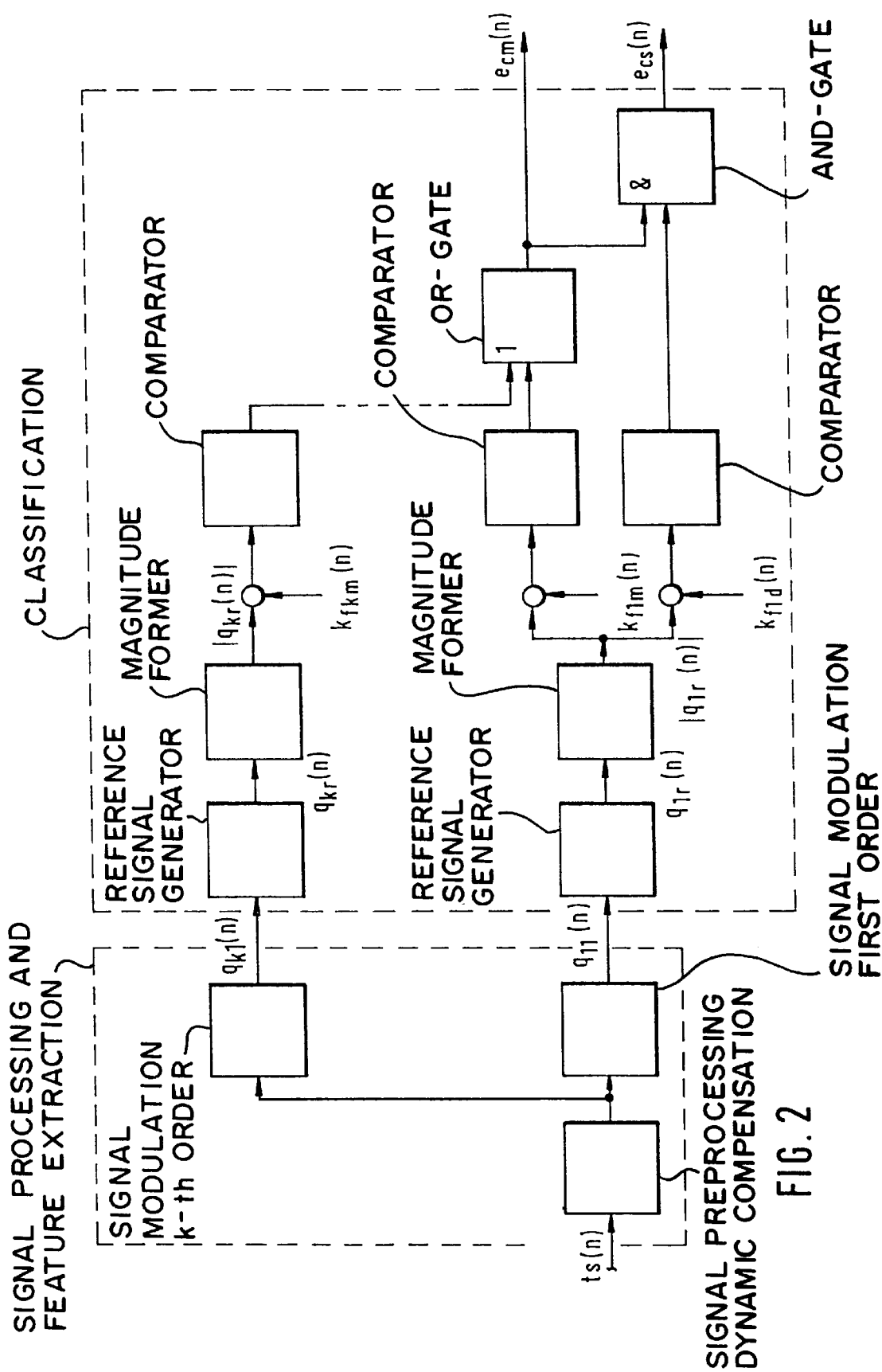
FIG. 2 is a function block diagram of an embodiment of the invention.

The segment times are further processed in the following stages as shown in the embodiment of FIG. 2.

The sensor signal ts(n) is applied to the input of the signal processing and feature-extraction stage 5. Within this stage, a signal processing takes place via dynamic compensation. The signal modulation stage functions to extract feature signals $q11(n)$ to $q1k(n)$ which are assigned to the first to k-th orders. The formation of the feature signals can then take place as disclosed in U.S. patent application Ser. No. 08/705,146, filed Aug. 29, 1996, which is incorporated herein by reference.

The necessary number of the orders is dependent upon the number of cylinders and is as follows:

| | |
|---|---|
| cylinder number = 3: | k = 1 |
| cylinder number = 4: | k = 1, 2 |
| cylinder number = 5: | k = 1, 2 |
| cylinder number = 6: | k = 1, 2, 3 |
| cylinder number = 8: | k = 1, 2, 4 |
| cylinder number = 12: | k = 1, 2, 3, 4, 6. |

The feature signals specific to an order are applied to respective reference signal generators and thereafter applied to respective magnitude forming blocks.

The reference signal generator is characterized in that the reference signal corresponds to the lowpass-filtered input signal for small signal changes of the input feature signal and in that the reference signal is frozen for large signal changes until small signal changes again occur.

Then, and after magnitudes are formed, the feature signals are subjected to a threshold value comparison. The threshold values can be characteristic-field dependent.

Figure 3:
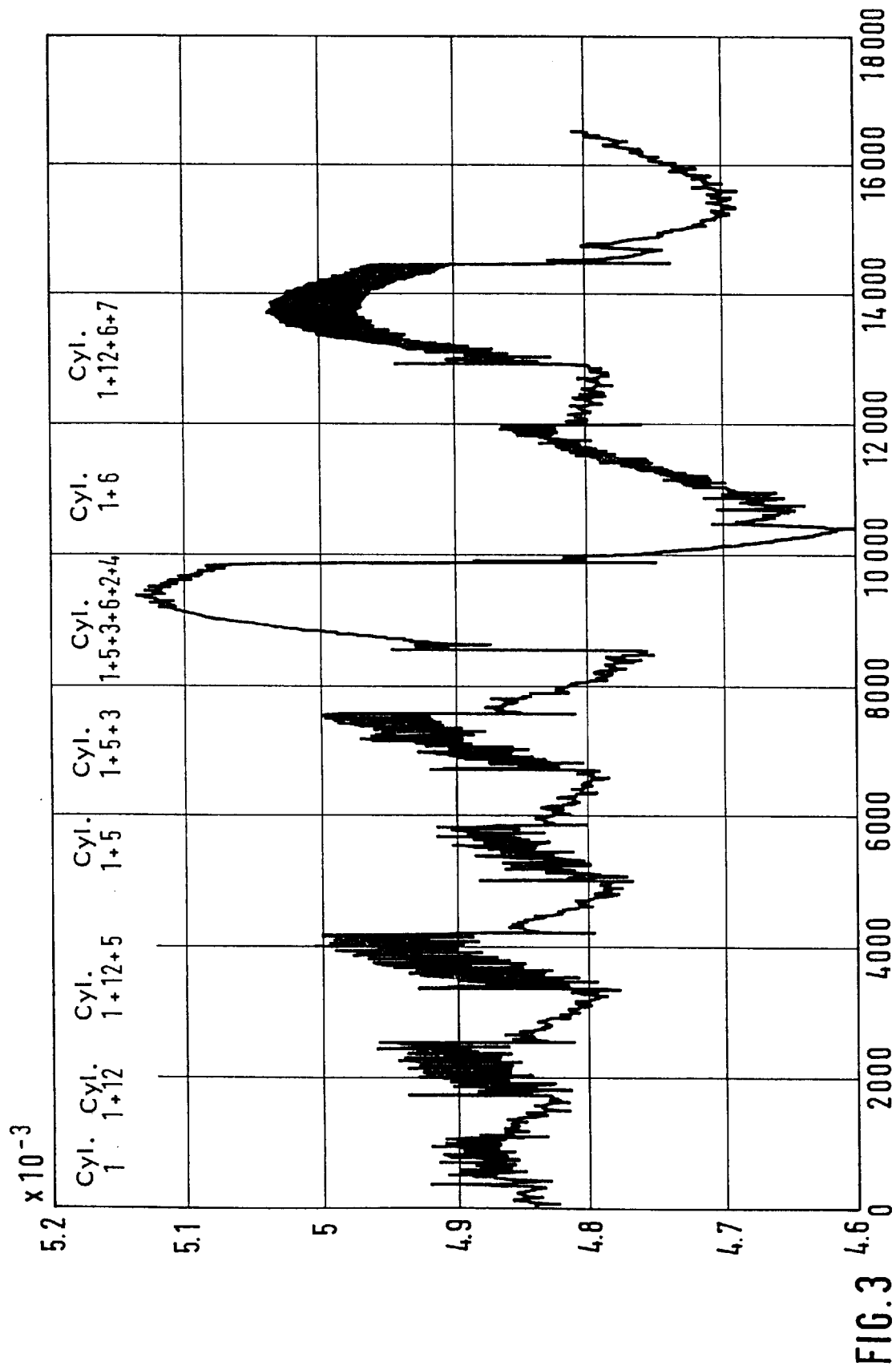
FIG. 3 shows a trace of a typical input signal ts(n) of the feature extraction stage with permanent misfires at one or several cylinders of a 12-cylinder engine.

FIG. 3 shows a typical input signal ts(n) having permanent misfires at one and several cylinders for a twelve cylinder engine at 2000 rpm and 32% load. The low signal-to-noise ratio for a bank misfire is apparent wherein every second cylinder misfires. The ignition sequence is as follows:

1 - 12 - 5 - 8 - 3 - 10 - 6 - 7 - 2 - 11 - 4 - 9

Figure 4:
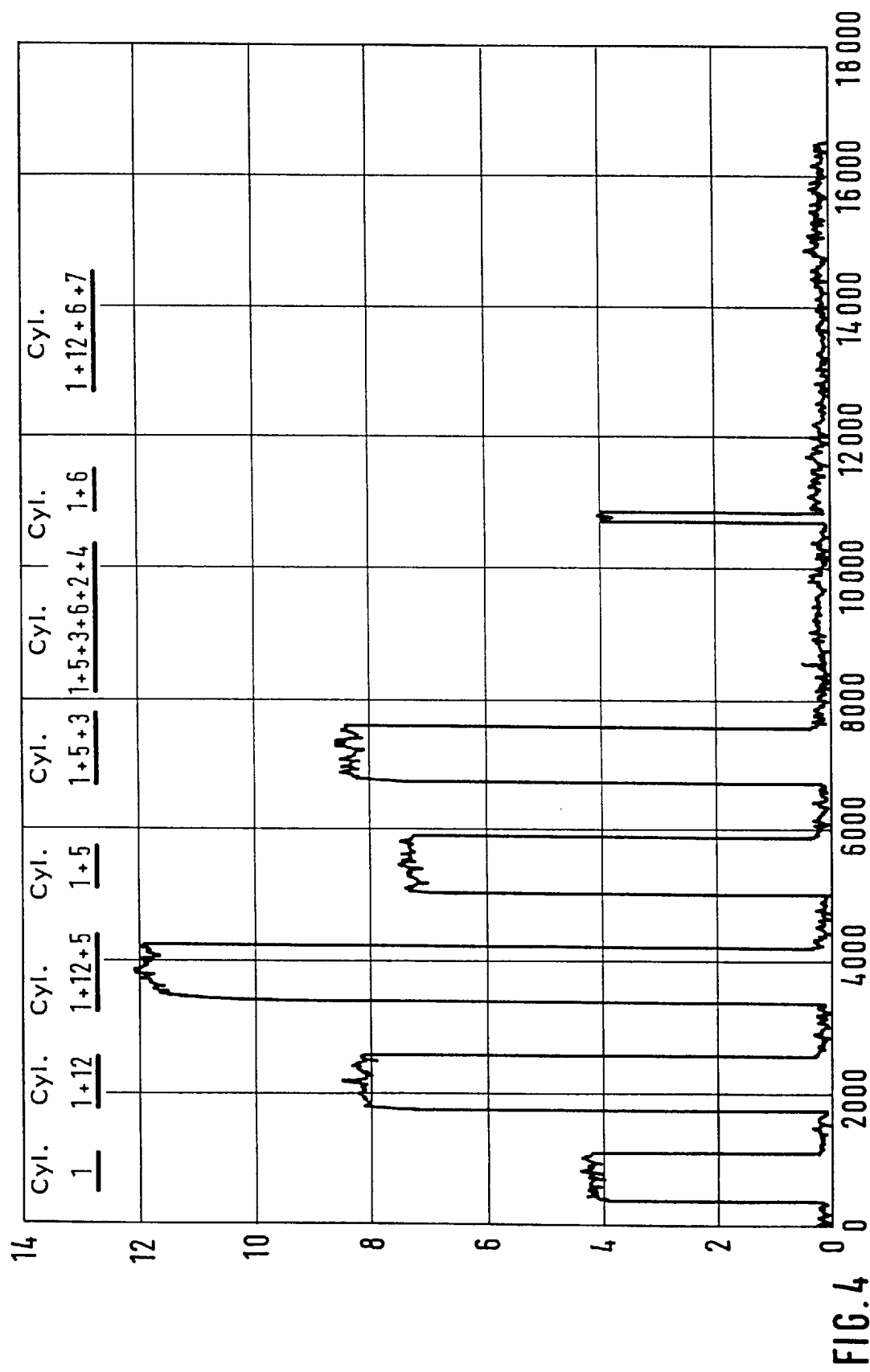
FIGS. 4, 5, and 6 show, by way of example, the accents of misfire combinations within the magnitudes of the feature signals of different orders.
Figure 5:
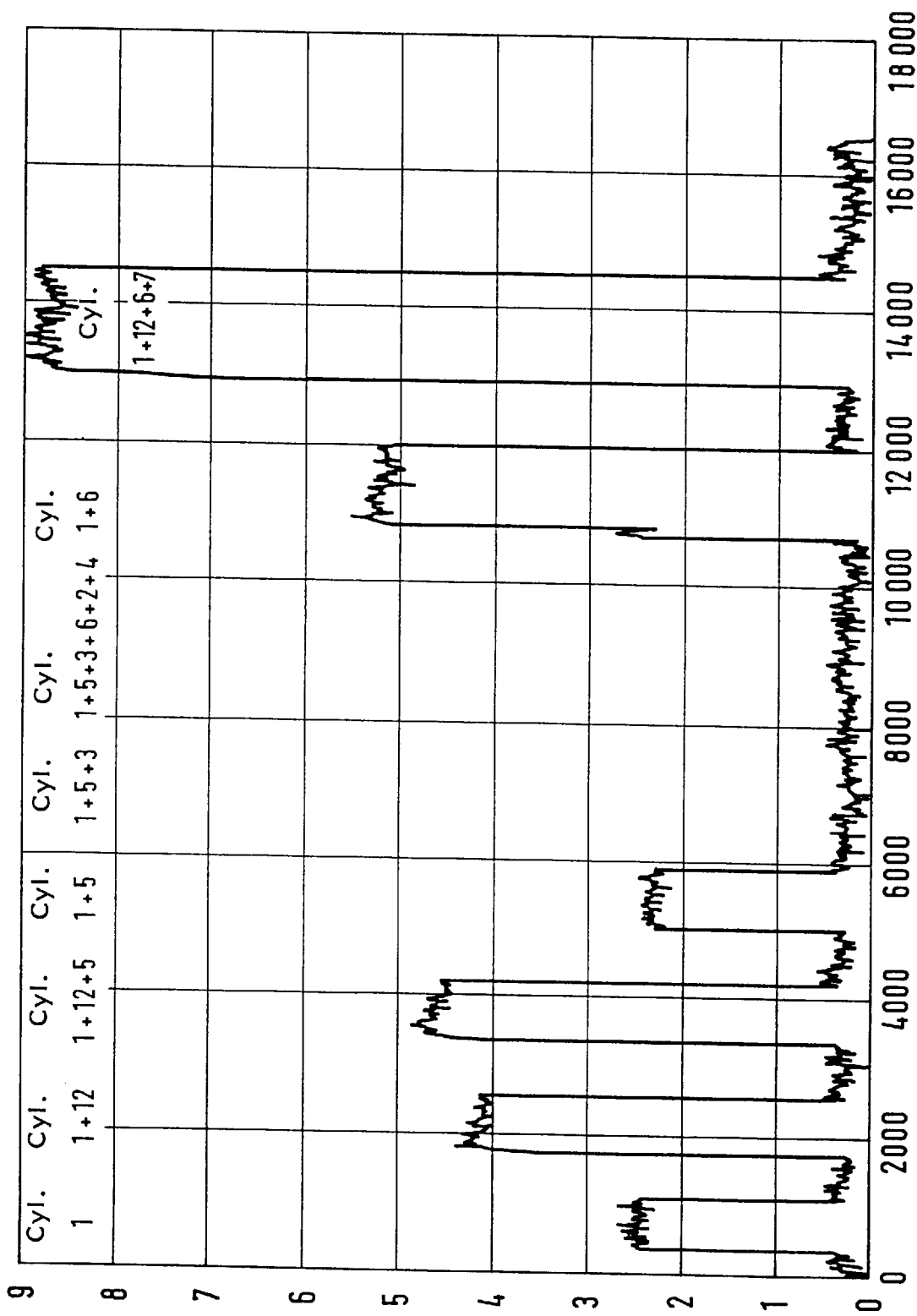
Figure 6:
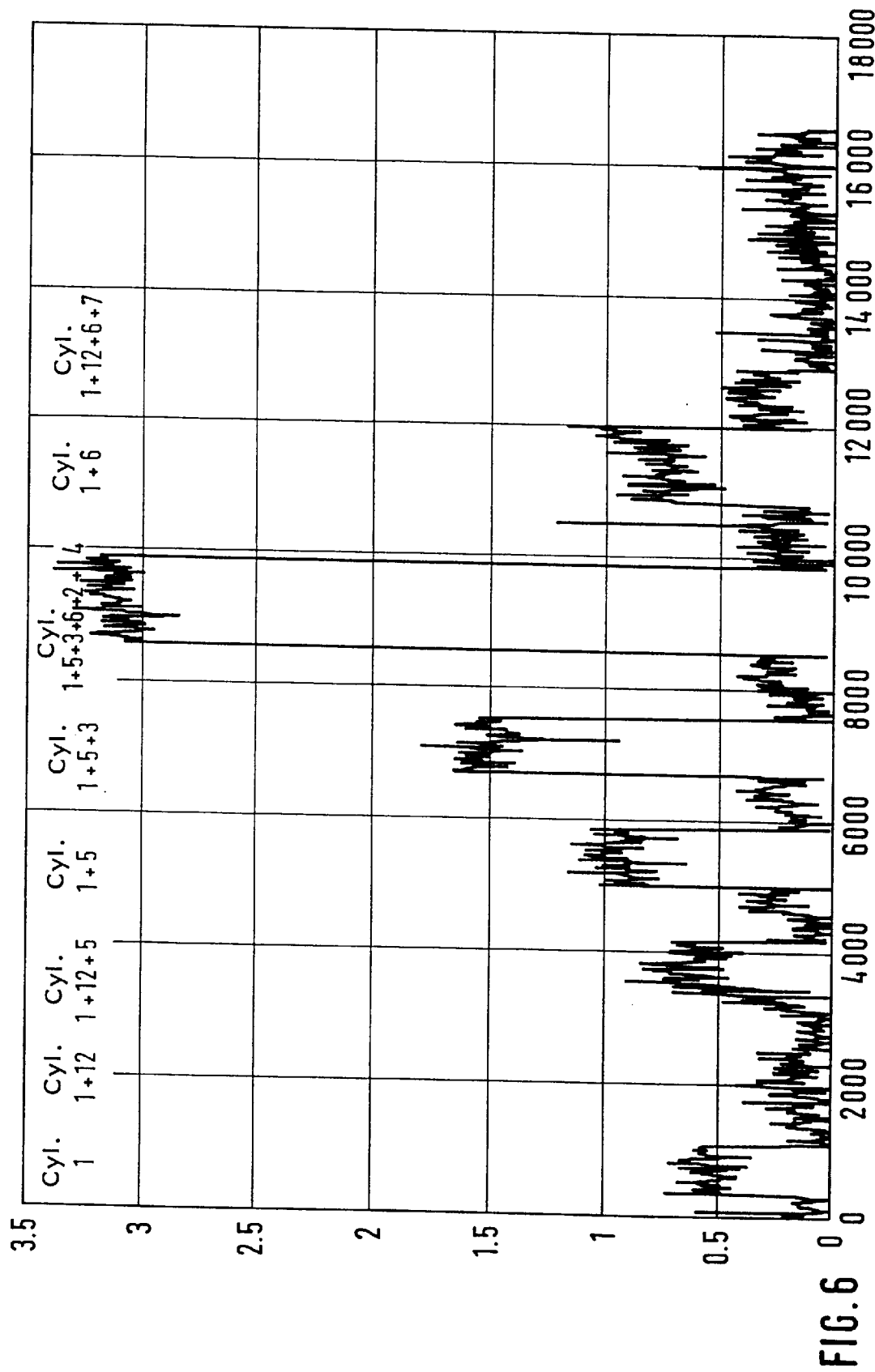

FIGS. 4, 5 and 6 show, by way of example, the accents of misfire combinations within the feature magnitude signals to which different orders are assigned.

The feature signals have the following characteristics:

(a) In the feature signal for the first order, the permanent misfire of a cylinder is clearly mapped. Multiple misfires distributed asymmetrically to the cylinders cause a larger amplitude by a multiple of 1.5. Multiple misfires distributed symmetrically as pairs to the cylinders and bank misfires generate no components. The short component for cylinders 1 to 6 is caused by the time-shifted cutoff of both cylinders.

(b) In the feature signal for the second order, the misfire components, which are distributed symmetrically in pairs to the cylinders, exceed by at least a factor of two those components of the misfires at a cylinder. Multiple permanent misfires, which are distributed asymmetrically to the cylinders, likewise have components in this order; whereas, bank misfires cannot be detected.

(c) Almost all permanent misfire types generate more or less accented components in the sixth order. The components of the bank misfire exceed those of permanent misfires at a cylinder by at least a factor of five.

These characteristics are the basis for the further evaluation of the feature signals in FIG. 2. The feature signals are subjected to a threshold value comparison after magnitude formation. The threshold values can be characteristic-field dependent.

A permanent misfire at a cylinder is detected preliminarily when the first threshold value is exceeded by the magnitude of the first feature signal assigned to the first order.

The detection signal for permanent misfires at several signals ecm(n) is actively switched when at least one threshold value is exceeded by the magnitude of the further input feature signals which represent higher orders or when the second higher threshold value is exceeded by the magnitude of the first feature signal.

Further logic coupling ensures that the detection signal for permanent misfires at a cylinder ecs(n) is always inactive for active detection signals for misfires at several cylinders and for inactive detection signal for permanent misfires at several cylinders, the preliminarily set detection signal for permanent misfires at a cylinder becomes finally active and in this way, permanent misfires at a cylinder are recognized.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in an internal combustion engine, the method comprising the steps of:

providing a first input feature signal wherein the nonuniformity of the rotational movement of the engine is defined on the basis of rpm or segment times and mapped within a first order;

comparing the magnitude of said first input feature signal to a first threshold value and to a second threshold value greater than said first threshold value;

providing additional input feature signals wherein the nonuniformity of the rotational movement of the engine is defined on the basis of rpm or segment times and mapped within additional orders;

the number of said additional input feature signals being dependent upon the number of cylinders of the engine;

providing threshold values assigned to respective ones of said additional orders;

comparing the magnitudes of said additional feature signals to a corresponding threshold value of each of said orders;

preliminarily recognizing a permanent misfire at a cylinder when said magnitude of said first input feature signal exceeds said first threshold value;

causing a recognition signal to be active for permanent misfires at several cylinders and thereby recognize permanent misfires at several cylinders when the magnitude of the corresponding additional input feature signal exceeds at least one of the threshold values or when the magnitude of said first input feature signal exceeds said second threshold value;

always switching off the recognition signal for permanent misfires at a cylinder when there is an active recognition signal for permanent misfires at several cylinders; and, causing said preliminary recognition signal for permanent misfires to become finally active and thereby recognize permanent misfires at a cylinder when the recognition signal for permanent misfires at several cylinders is inactive.

2. The method of claim 1, comprising the further step of:

switching a reference generator in the signal path of the individual input feature signal before or after formation of the absolute value for the threshold value comparison; and, performing a signal smoothing in said reference generator via linear or nonlinear lowpass filtering.

3. The method of claim 1, comprising the further step of providing an identification of the misfiring cylinder when there is an inactive recognition signal for permanent misfires at several cylinders and when there is an active recognition signal for permanent misfires at one cylinder.

4. The method of claim 1, comprising the further step of providing an identification of at least two permanent misfiring cylinders when there is an active recognition signal for permanent misfires at several cylinders.

* * * * *